United States Patent
Mattes et al.

[15] 3,703,790
[45] Nov. 28, 1972

[54] ACCESSORY FOR ADHESIVELY FIXING AND BONDING FASTENING ELEMENTS IN FIXING HOLES

[72] Inventors: Heinz Otto Mattes; Friedrich Flesch, both of Emmendingen, Germany

[73] Assignee: Max Langensiepen Kom. Ges., Emmendingen, Germany

[22] Filed: Jan. 19, 1971

[21] Appl. No.: 107,752

[30] Foreign Application Priority Data

Jan. 22, 1970 Germany ......... G 70 02 080.3

[52] U.S. Cl. ........................................ 52/98, 52/704
[51] Int. Cl. ........................... E04b 1/38, E04b 1/41
[58] Field of Search ........ 52/98, 99, 153, 704; 61/45; 85/65, 85

[56] References Cited

UNITED STATES PATENTS

| | | | |
|---|---|---|---|
| 2,092,341 | 9/1937 | DeVries | 52/704 |
| 2,670,007 | 2/1954 | Adams | 52/704 X |
| 2,189,542 | 2/1940 | Caldwell et al. | 52/153 |
| 2,849,866 | 9/1958 | Flygare et al. | 52/704 X |
| 2,889,614 | 6/1959 | Seely | 52/155 X |
| 3,132,726 | 5/1964 | Johnson | 52/153 |
| 3,308,585 | 3/1967 | Fischer | 52/704 |

Primary Examiner—Alfred C. Perham
Attorney—Michael S. Striker

[57] ABSTRACT

An accessory for adhesively fixing and bonding fastening elements in fixing holes, particularly in soft building materials, by the destruction inside a fixing hole of a cartridge containing an adhesive, preferably the two components of a two-component adhesive, and distributing the adhesive after its release. The accessory has the form of an insertion comprising a protective sleeve accommodating an adhesive-filled cartridge. The protective sleeve has an external diameter adapted to fit into a fixing hole and an internal diameter to fit around a fastening element that is to be secured in the fixing hole. The length of the protective sleeve corresponds to the length of the fastening element and its peripheral surface is provided with holes for the passage therethrough of the adhesive after its release. The external end of the protective sleeve is open.

7 Claims, 3 Drawing Figures

PATENTED NOV 28 1972

3,703,790

INVENTORS:
HEINZ OTTO MATTES
FRIEDRICH FLESCH

ACCESSORY FOR ADHESIVELY FIXING AND BONDING FASTENING ELEMENTS IN FIXING HOLES

BACKGROUND OF THE INVENTION

This invention relates to an accessory which assists in securing fastening elements in fixing holes with the aid of an adhesive, particularly in holes formed in soft building materials, by destroying an adhesive-filled cartridge inside the hole and distributing the issuing adhesive inside the hole.

The expression "soft building materials" is understood to mean any material having a compressive strength not exceeding about 75 kp/sq.cm, such as breeze concrete, building panels made of plaster and so forth, wherein the insertion of the fastening element and the destruction of the adhesive-filled cartridge would be likely to damage the walls of the hole.

Adhesive dowels or bolts are known in the art which are secured with the aid of an adhesive, usually a two-component adhesive, inside fixing holes drilled or otherwise preformed in a wall, ceiling or the like. Generally speaking the adhesive is contained in a cartridge consisting of an easily destructible material, such as glass, but otherwise having properties that will not interfere with the process of adhesive bonding. A two-component adhesive is mostly preferred and a second inner cartridge containing a second adhesive component is then usually contained inside an outer cartridge containing the first adhesive component. Elements that are preferentially secured by this method include adhesively bonded anchoring bolts, dowels, as well as elements such as hooks, threaded pins and the like which possess an appropriate shaft-like leading end that can be inserted into a fixing hole and adhesively bonded to the walls of the fixing hole. The term "fastening elements" as hereafter used is intended to embrace within its ambit any such elements.

For the introduction and adhesive bonding of such fastening elements it is the usual practice first to insert an adhesive cartridge into the preformed fixing hole. This cartridge is destroyed when the fastening element is driven into the hole and the adhesive contained in the cartridge, generally comprising two components, runs out. The components then mix and the mixture distributes itself more or less evenly between the walls of the hole and the surface of the fastening element.

Nevertheless the above-described method of adhesively bonding fastening elements in their fixing holes is still not entirely satisfactory. For example, when the fastening element is introduced into the hole this does not necessarily ensure that the components of a two-component adhesive will satisfactorily mix. It is also by no means certain that the adhesive film will uniformly fill the clearance between the fastening element and the walls of the hole instead of accumulating locally at points in the fixing hole where the adhesive is unable to have a satisfactory bonding effect. For instance, the adhesive may easily collect at the inner end of a hole that is rather too deep for the length of the fastening element and into which the fastening element does not therefore project. Moreover, a substantial proportion of the adhesive may also drain away into pores and so forth before it has had time to set.

Particularly in soft building materials, such as cellular concrete, plaster panels, breeze concrete and so forth, other difficulties may also arise.

Usually fastening elements are inserted into fixing holes whilst being rotated about their longitudinal axis and this is thought to promote the mixing of the two components of the adhesive. When the adhesive cartridges are destroyed as intended, splinters of glass of major and minor size are liable to damage the walls of the fixing hold during say process of mixing which as such is desired. The volumetric capacity of the fixing hole may be considerably enlarged in this way and the reliability of the fixation that is obtained may be at risk. Moreover, the adhesive may tend to collect in enlargements inside the fixing hole, for instance where portions of the wall have broken away or the fixing hole has been widened for other reasons. The bonding surface may then be too large for the volume of adhesive that is available.

SUMMARY OF THE INVENTION

It is an object of the present invention to improve the fixation of fastening elements in fixing holes and to ensure the creation of a dependable and safe bond, particularly in the case of fastenings in soft building materials.

Another object of the invention is to improve the load-bearing capacity of the adhesively bonded fastening element in such soft materials.

To attain these objects the present invention provides an accessory for adhesively fixing and bonding fastening elements in fixing holes, particularly in soft building materials, by the destruction inside a fixing hole of a cartridge containing an adhesive, preferably the two components of a two-component adhesive, and distributing the adhesive after its release, said accessory having the form of an insertion comprising a protective sleeve accommodating an adhesive filled cartridge and having an external diameter adapted to fit into a fixing hole and an internal diameter to fit around a fastening element, the length of the protective sleeve corresponding to the length of the fastening element and its peripheral surface being provided with holes for the passage therethrough of the adhesive after its release, the protective sleeve having an open external end.

An insertion of the proposed kind prevents larger fragments of the cartridge case or cases containing the adhesive, after their destruction by the fastening element that is driven into the hole, from biting into the walls of the fixing hole and causing portions of the wall from being broken away. More particularly when the fastening element is twisted into the insertion the latter prevents cartridge case splinters from grinding the wall of the fixing hole and from thereby undesirably enlarging the same. All larger splinters and fragments are retained inside the protective sleeve. Minor splinters which still pass through the perforations in the protective sleeve, and which may thus make contact with the wall of the fixing hole will be too small to do much damage and in any event the presence of the protective sleeve prevents them from being entrained by any rotary motion of the fastening element. The wall of the fixing hole is thus effectively protected from damage. At the same time the openings perforating the sides of the protective sleeve have the effect of distributing the adhesive more evenly so that the sleeve that has been referred to as being "protective" also serves the purpose of uniformly dispersing the adhesive.

In order further to assist a uniform distribution of the adhesive the openings perforating the walls of the sleeve in the zone where the adhesive bond is intended to form are preferably uniformly distributed over the surface of the protective sleeve.

The inner end of the protective sleeve is preferably substantially closed. This stops major volumes of adhesive from leaving the intended zone of adhesive bonding and from entering the inner end of the hole.

When the proposed protective sleeve is used in soft building materials it will often be useful to provide the sleeve, preferably in the region near its external end, with a supporting sheet metal wing for reducing the load the wall of the fixing hole is called upon to support. Conveniently this wing may consist of two fins radially projecting from the protective sleeve and of a trough-shaped portion for the reception of the protective sleeve between the two fins. In such an arrangement the fins will bear part of the load when the fastening element is loaded in a direction normal to the plane of the fins. Moreover, the fins which must be tapped into the wall may serve to locate the insertion whilst the fixing work is carried out and before the adhesive has set. This is a useful feature, particularly in holes that have been driven more or less vertically upwards. Furthermore, the fins may also function as a kind of stop or abutment preventing the insertion from being pushed too far into the hole when the adhesive cartridge cases are destroyed and the fastening element is driven into place.

Conveniently the protective sleeve may be formed by folding and bending a perforated metal strip. This simplifies the process of manufacture.

Moreover, with advantage the protective sleeve may comprise two approximately trough-shaped shanks which are held together by being attached at least along part of their length to the supporting wing. On the one hand this enables the insertion to be easily produced from a folded perforated strip and secured to maintain its intended shape. On the other hand both the supporting wing and the protective sleeve contribute towards reducing and more evenly distributing the load supported by the wall of the hole whenever the fastening element is called upon to support a load normal to its longitudinal axis. In such a case the presence of the protective sleeve itself will assist in more uniformly distributing the load along the length of the hole.

Preferably the protective sleeve may have an external contour that is an appropriate fit in the fixing hole for the sleeve to be lightly wedged inside the hole after insertion.

Further, the supporting wing may likewise be provided with some openings to assist in more evenly distributing the adhesive.

BRIEF DESCRIPTION OF THE DRAWING

An embodiment of the invention will now be described by way of example and with reference to the accompanying drawing, in which.

DESCRIPTION OF THE PREFERRED EMBODIMENT

Figure 1:
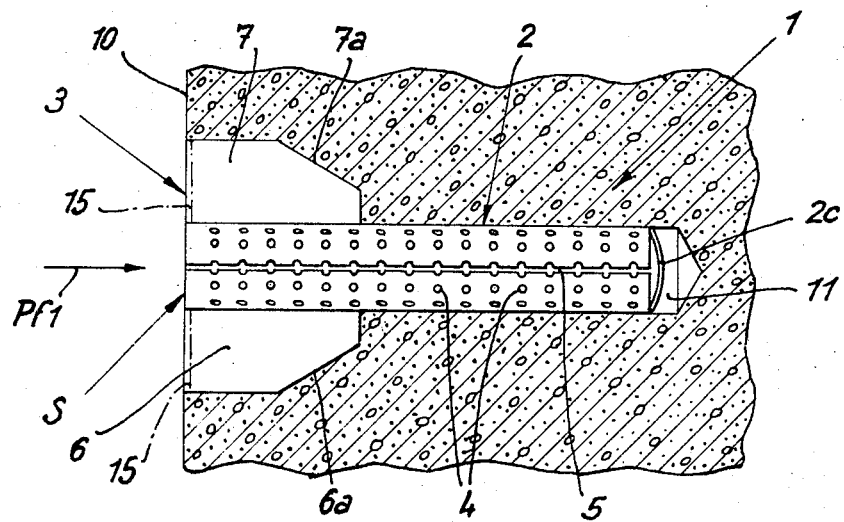
FIG. 1 is a top plan view of an insertion inside a fixing hole.

FIG. 1 shows an accessory according to the invention in the form of an insertion 1 comprising a protective sleeve 2 which may be made for example of sheet metal or possibly also of a suitable synthetic plastics. Preferably a supporting sheet metal wing generally indicated by the reference numeral 3 is attached to the protective sleeve 2. The protective sleeve 2 contains numerous openings 4 for the passage therethrough of an adhesive. Substantially these openings 4 are uniformly distributed over the surface of the sleeve 2. For the introduction of a bolt-shaped fastening element B indicated in FIG. 2 and for the reception of an adhesive cartridge 12 yet to be described in greater detail the protective sleeve 2 is hollow and its outside end S is open. If the protective sleeve 2 consists of a folded and bent strip of perforated material it will be divided by parting slits 5 along its longitudinal center line. The adhesive can readily disperse through these slits 5 along the entire length of the sleeve 2. The slits may be narrow if this is desirable. It will be understood from FIGS. 1 and 2 that the external diameter of the protective sleeve 2 fits snugly into the internal diameter of a fixing hole 11 in a wall 10 or the like. The insertion 1 can be pushed into the hole 11 without undue effort. Correspondingly the internal diameter of the sleeve 2 and the external diameter of the fastening element B are a matching fit. The fastening element B is just insertable into the protective sleeve 2 without the application of force and only a small peripheral clearance gap remains between the fastening element and the inside of the protective sleeve as well as between the exterior of the protective sleeve 2 and the wall of the fixing hole 11. Consequently a thin, fairly uniform film of adhesive can form in the zone that is substantially defined by the protective sleeve 2. The best conditions for the creation of a satisfactory bond are thus provided.

The supporting wing 3 projects radially from each side of the protective sleeve 2 and thus forms two coplanar fins 6 and 7. Between the two fins the supporting wing 3 is bent to form a trough 8 of substantially semicircular cross section. This trough 8 is designed to receive the protective sleeve 2 (FIG. 3) which is connected to the wing 3 in this region, for instance by a weld or an adhesive bond. At least one of the parting slits 5 is bedded in the trough 8 of the wing 3 and both halves 2a and 2b of the protective sleeve 2 are thus held together in the desired shape by being both attached to the wing 3.

The end of the protective sleeve 2 remote from the wing 3 has a head portion 2c that has been produced by folding and bending the perforated strip from which the protective sleeve is made. In such an arrangement the protective sleeve will therefore be an integral member comprising two elongated shanks or halves 2a and 2b which are united at the head portion 2c and held in the correct relative positions at the other end by their affixation to the wing 3.

For anchoring a fastening element B with the aid of the insertion 1, in a wall, particularly when this consists of a soft material the following procedure may be adopted:

First a fixing hole 11 is drilled into the wall 10 consisting for instance of a breeze concrete having a compressive strength of 50 kp/sq.cm. The insertion 1 is then pushed into the hole. Slits may be provided in the wall 10 for the reception of the fins 6 and 7 or alternatively the fins 6 and 7 may be driven into the wall in the direction indicated by the arrow Pf 1 in FIG. 1, this operation being facilitated by swept back leading edges 6a and 7a of the two fins. The next step is to insert an adhesive cartridge 12, comprising an outer cartridge case 12a and an inner case 12b, into the protective sleeve 2. This cartridge 12 which contains the components of a two-component adhesive is partly visible in FIG. 2. Both the inside and outside cartridge cases 12 and 12b are made of glass.

Figure 2:
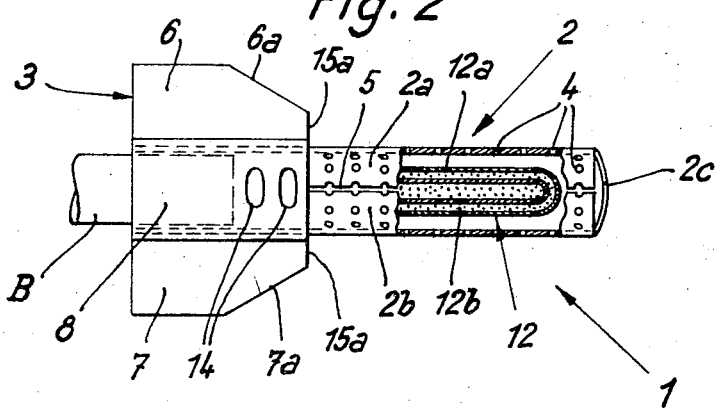
FIG. 2 is a similar view of the same insertion as in FIG. 1 showing the protective sleeve partly broken away, the insertion being turned through an angle of 180° in relation to its position shown in FIG. 1.

The fastening element B is now driven in the direction of the arrow Pf 1 into the protective sleeve 2. This results in the destruction of the two glass cases 12a and 12b. The two components of the adhesive are set free and mix. This is assisted by rotating the fastening element B about its longitudinal axis, as well as by the continued further penetration of the fastening element B into the interior of the insertion 1. The glass splinters of the broken cases and any other solid fragments thereof are substantially retained inside the protective sleeve and together with the fastening element B they fill most of the interior of the sleeve. This forces a proportion of the adhesive to pass from the narrow circumferential clearance between fastening element B and protective sleeve 2 through the perforations 4 in the sleeve as well as possibly through the parting slits 5, thereby distributing the adhesive in fairly even dispersion in the substantially annular clearance gaps between the fastening element B, the protective sleeve 2 and the wall of the fixing hole 11. Apart from the pressure of the liquid adhesive the protective action of the screening sleeve generates no significant expanding pressure that may act on the wall of the fixing hole 11. More particularly, splinters and fragments of the adhesive cartridge which are subjected to the thrust and pressure as well as the rotation of the fastening element are prevented from scouring and damaging the wall of the hole 11. Only little adhesive can issue from the head portion 2c of the protective sleeve since the openings 4 are distributed around the periphery of said sleeve. If the head portion 2c of the sleeve, as exemplified in FIGS. 1 and 2, is a closed dome-shaped end face, the volume of adhesive that can enter the inner end of the hole 11 is very restricted. In any event a large-surface adhesive bond between the wall of the hole 11, the protective sleeve 2 and the fastening element B is certain to be formed, hence ensuring a reliable and safe fixation of the fastening element in the wall.

If a fastening element according to FIG. 1 is heavily loaded, for instance in a direction normal to the plane of the drawing paper, then this load will generate considerable frictional forces acting on the wall of the fixing hole 11. Particularly when the fixing hole is in a soft building material the wing 3 will then assist in ensuring that these forces are also transmitted to the wall 10 by the fins 6 and 7, thereby considerably reducing the specific pressure. The fastening element B can therefore carry much higher loads in a direction perpendicular to the effective plane of the wing 3 and its fins 6 and 7. The protective sleeve raises the load-bearing capacity under loads acting in any direction normal to the longitudinal axis of the fastening element.

In FIG. 2 two additional openings 14 are provided in the wing 3. It may be desirable also to provide such openings for the passage therethrough of adhesive at least in the leading, i.e. inner zone of the wing.

It has been found that the proposed insertion 1 has the effect of causing the two components of the two-component adhesive to be very satisfactorily mixed and the mixture to be correspondingly well distributed if one component consists of a paste.

Figure 3:
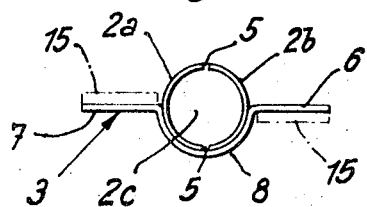
FIG. 3 is an end-on view of the insertion seen in the direction indicated by an arrow Pf 1 in FIG. 1.

The insertion 1 may be provided with an abutment 15 which determines the depth to which this element 1 can be driven into the hole. This abutment 15 may be formed by providing the fins 6 and 7 with off-angled rear edges, as indicated in FIGS. 1 and 3 in dot and dash lines. Moreover, leading edges 15a of the fins 6 and 7 that project at right angles from the longitudinal axis of the sleeve might also be utilized for the purpose of forming such an abutment. When the adhesive cartridge cases are destroyed by the advancing fastening element B one or more such abutments 15 and/or 15a will prevent the insertion 1 from penetrating too deeply. Otherwise the fins 6 and 7 also assist, by the friction they create when entering the wall 10, in keeping the insertion 1 in position as illustrated in FIG. 1.

The invention may be embodied in other specific forms without departing from the spirit or essential characteristics thereof. The embodiment is therefore to be considered in all respects as illustrative and not restrictive.

What is claimed is:

1. An accessory for adhesively fixing and bonding fastening elements in fixing holes, particularly in soft building materials, by the destructive inside a fixing hole of a cartridge containing an adhesive, preferably the two components of a two component adhesvie, and distributing the adhesive after its release, said accessory comprising a protective sleeve accommodating an adhesive-filled cartridge and having an external diameter adapted to fit into a fixing hole, and an internal diameter to fit around a fastening element and a length corresponding to that of the latter, said sleeve comprising a pair of substantially semi-circular strip portions facing each other and being integrally connected to each other at one end so that said sleeve is substantially closed at said one end and open at the other end thereof, said one end being the inner end of said sleeve when the latter is inserted into a fixing hole, said strip portions being formed with holes for the passage therethrough of the adhesive after its release; and including a load distributing element connecting said sleeve portions of said sleeve in the region of said open end and radially projecting beyond the outer surface of said sleeve.

2. An accessory according to claim 1, wherein said holes in said strip portions are substantially uniformly distributed at least in the zone where a bond between said fastening element and the building material is intended.

3. An accessory according to claim 1, wherein said load distributing element comprises a supporting wing having a pair of radially projecting fins and a troughshaped portion integrally connecting said fins and in part encompassing said other end of said sleeve.

4. An accessory according to claim 3, wherein said strip portions are connected to each other in the region of said other end by said trough-shaped portion of said supporting wing.

5. An accessory according to claim 1, wherein the protective sleeve has an external contour that is a suitable fit in the fixing hole for the sleeve to be lightly wedged inside the hole when inserted.

6. An accessory according to claim 3, wherein the supporting wing is provided with openings for the passage therethrough of the adhesive.

7. An accessory according to claim 1, wherein the insertion is formed with at least one abutment preventing the insertion from penetrating too deeply into the fixing hole.

* * * * *